United States Patent [19]

Aidlin et al.

[11] Patent Number: 4,930,327

[45] Date of Patent: Jun. 5, 1990

[54] BATTERY CORE WRAPPING METHOD AND APPARATUS

[75] Inventors: Stephen H. Aidlin; Bradley E. Reed; John B. Strassner, all of Sarasota, Fla.

[73] Assignee: Aidlin Automation Corp., Sarasota, Fla.

[21] Appl. No.: 290,263

[22] Filed: Dec. 27, 1988

[51] Int. Cl.$^5$ .............................................. B21C 47/04
[52] U.S. Cl. .................................... 72/148; 29/623.1; 29/731
[58] Field of Search ..................... 29/605, 623.1, 623.3, 29/731; 72/146, 147, 148; 242/56.1, 67.1 R; 429/94

[56] References Cited

U.S. PATENT DOCUMENTS

| | | | |
|---|---|---|---|
| 3,006,572 | 10/1961 | Cooper | 72/148 |
| 3,905,090 | 9/1975 | Painter | 228/164 |
| 3,994,656 | 11/1976 | Van Ausdall | 72/146 X |
| 4,158,300 | 6/1979 | Hug et al. | 72/148 |
| 4,203,206 | 5/1980 | Morris et al. | 29/731 |
| 4,212,179 | 7/1980 | Juergens | 72/148 |

*Primary Examiner*—E. Michael Combs
*Attorney, Agent, or Firm*—Dominik, Stein, Saccocio, Reese, Colitz & Van Der Wall

[57] ABSTRACT

Apparatus for the fabrication of rechargeable battery cores formed of component layers of electrically conductive layers and inter-leafed electrically insulating layers in a coil-like manner comprising an arbor rotatable about its axis for the receipt and support of the core component layers and for winding such core component layers thereon; associated support roller means located adjacent to the arbor for forming a nip and for feeding the component layers to and around the arbor; tray means positioned adjacent to the arbor and support roller means to feed the component layers to the nip and around the arbor; and a tucker bar operatively associated with the arbor and support roller means adapted to move the leading edge of the insulating component layers for being rotated around the arbor prior to the feeding of the conductive component layers. Also disclosed is the method of fabricating rechargeable battery cores.

3 Claims, 4 Drawing Sheets

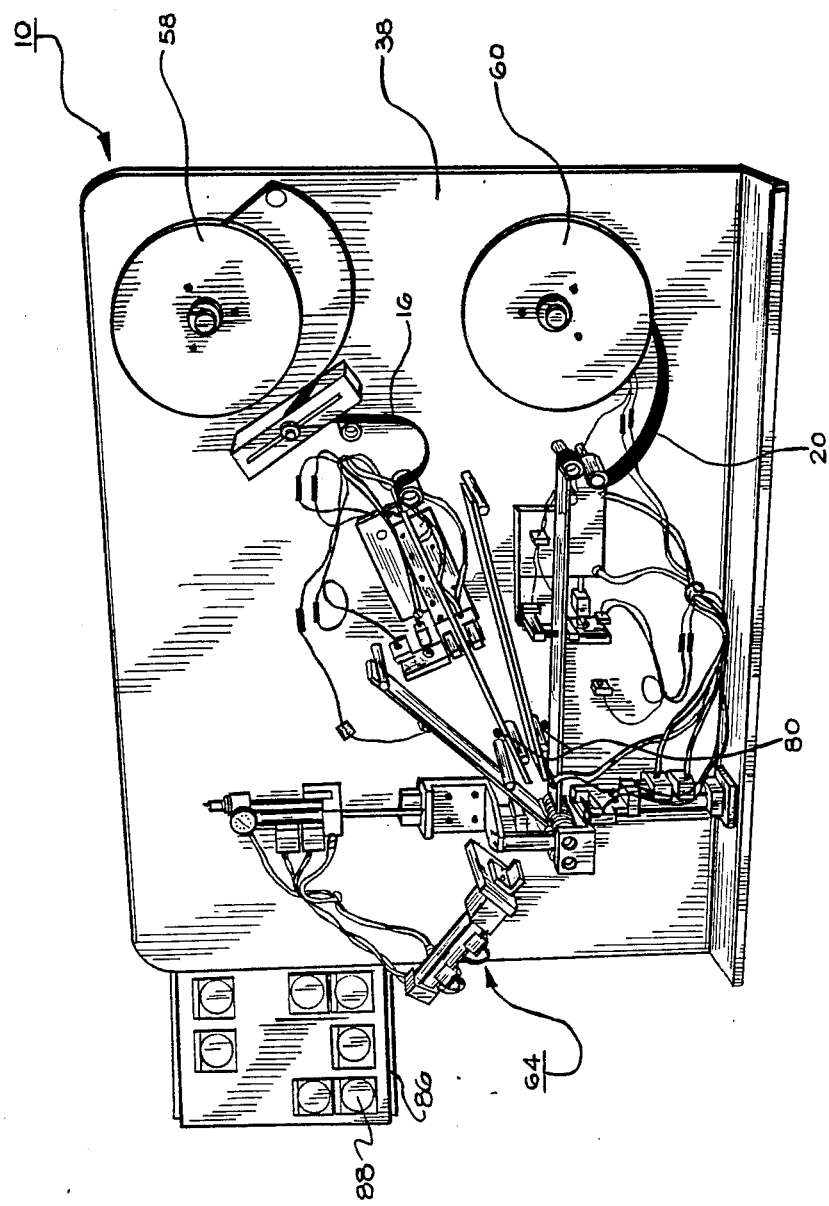

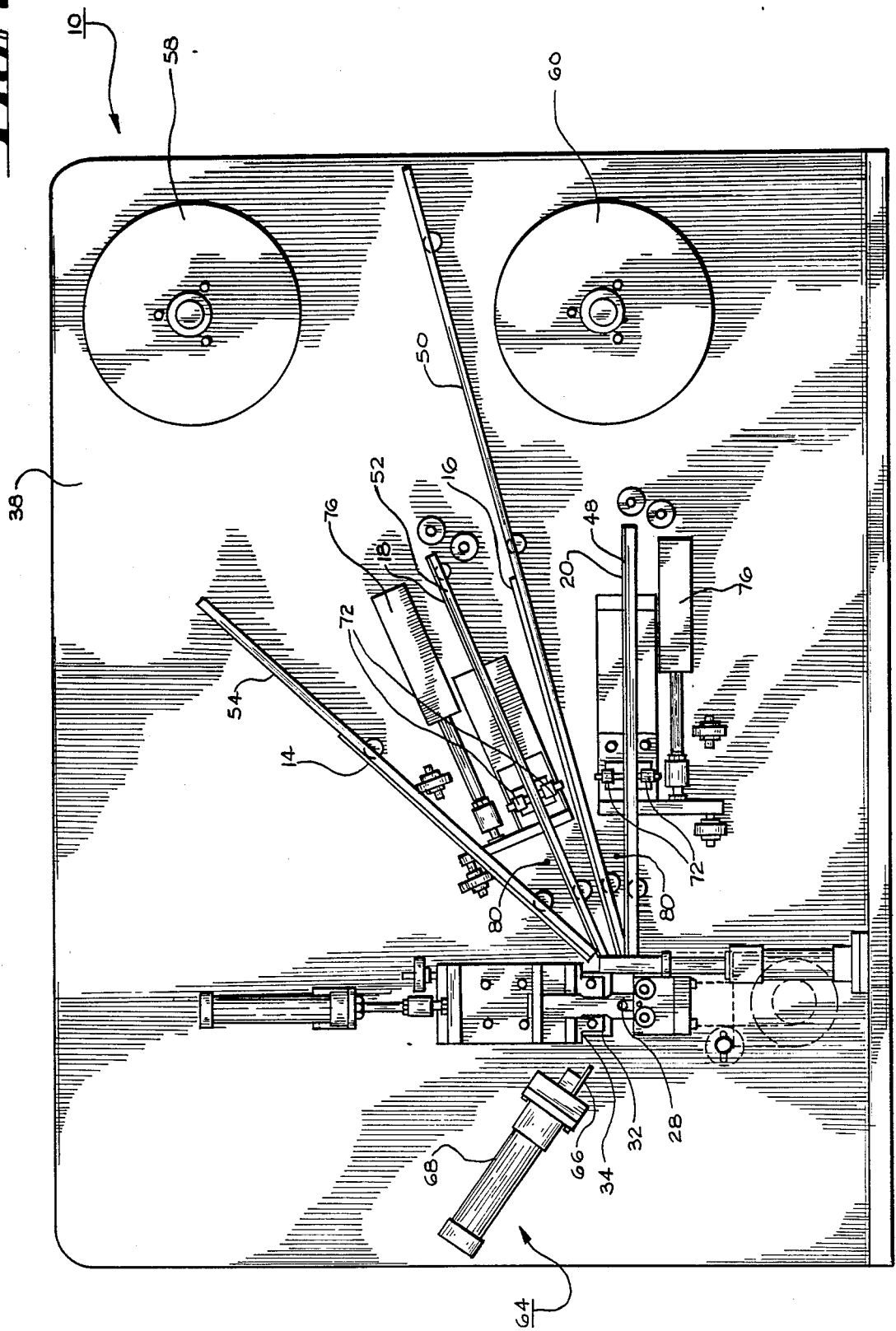

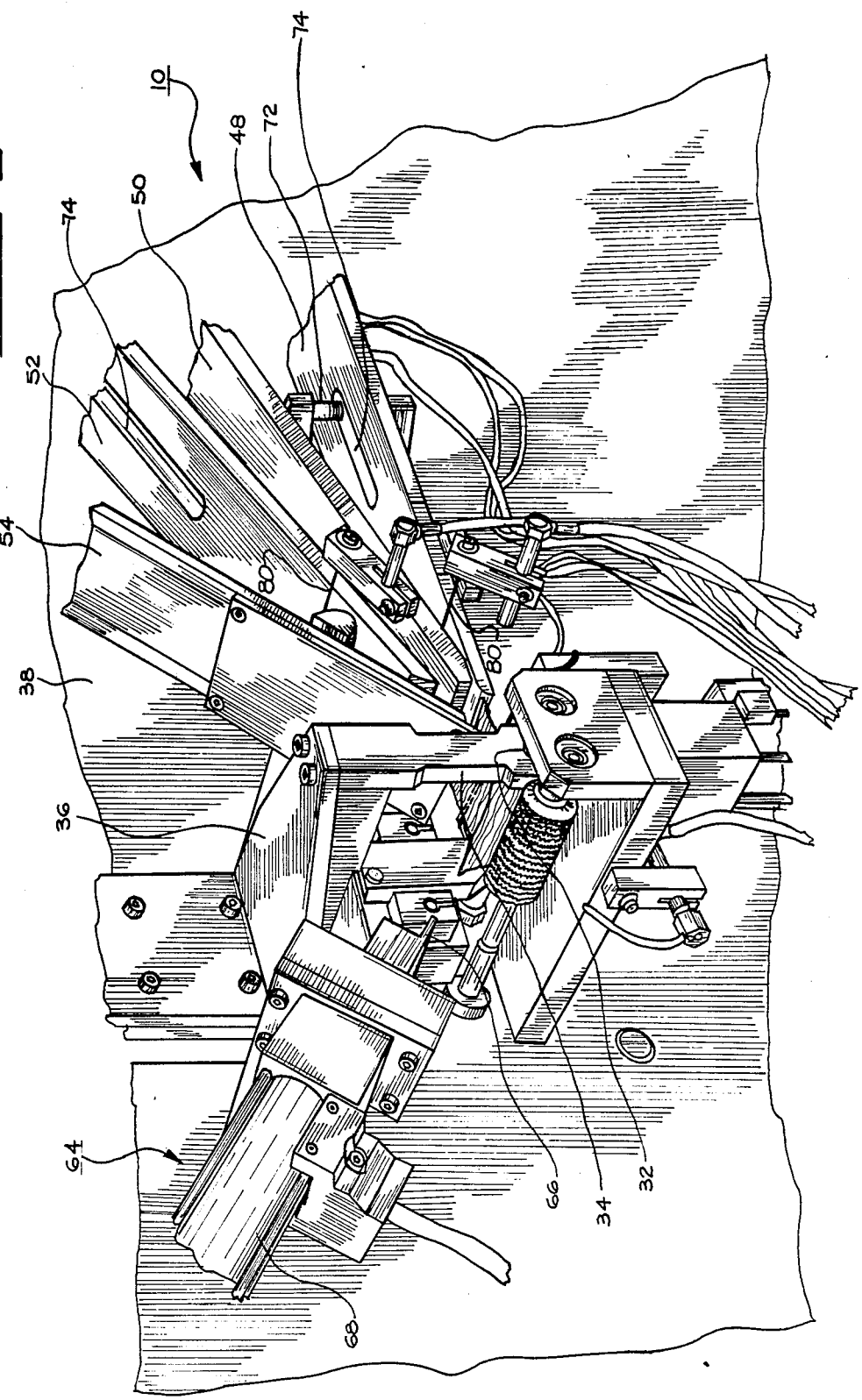

BATTERY CORE WRAPPING METHOD AND APPARATUS

BACKGROUND OF THE INVENTION

1. Field of the Invention

This invention relates to a method and apparatus for wrapping battery cores and, more particularly, to wrapping layers of anodes, cathodes and insulator material for use as rechargeable nickel/cadmium battery cores.

2. Description of the Background Art

A relatively recent development in the battery art is the rechargeable battery. A core of such rechargeable battery is made of an electrically conductive anode and an electrically conductive cathode wrapped in a cylindrical manner about an axis in a jelly roll fashion. The conductive layers are separated by insulating layers such as paper.

With the development of such rechargeable batteries, there has been a continuing effort to devise methods and apparatus for the convenient fabrication of their cores. Core wrapping methods and apparatus are disclosed and practiced in commercial machinery such as those marketed by Engineering Innovations, Inc. of Gainesville, Florida; Rafferty, Inc., also of Gainesville, Florida; and General Electric Corporation of Schenectady, New York. Such commercial machinery for wrapping battery cores are evidence of the continuing effort to develop more convenient, efficient and economical techniques in this field of technology. While adequate for their intended purposes, present core wrapping machines are characterized by complex mechanisms which unduly increase the cost of such cores and the batteries in which they are utilized. In addition, such core wrapping machinery are characterized by an undesirable layer of insulating material, extending diagonally across the open central portion of the core. With these shortcomings, it is an object of the present to provide machinery which overcomes the aforementioned inadequacies of the prior art devices and methods and to provide an improvement which is a significant contribution to the battery core wrapper art.

It is a further object of the invention to provide a method and apparatus for the fabrication of rechargeable battery cores formed of component layers of electrically conductive layers and inter-leafed electrically insulating layers in a coil-like manner comprising an arbor rotatable about its axis for the receipt and support of the core component layers and for winding such core component layers thereon; associated support roller means located adjacent to the arbor for forming a nip and for feeding the component layers to and around the arbor; tray means positioned adjacent to the arbor and support roller means to feed the component layers to the nip and around the arbor; and a tucker bar operatively associated with the arbor and support roller means adapted to move the leading edge of the insulating component layers for being rotated around the arbor prior to the feeding of the conductive component layers.

It is a further object of the invention is to feed anode, cathode and inter-leafed insulating material for winding around a rotating arbor and to initiate such winding with the assistance of a tucker bar.

A further object of the present invention to wrap component layers into a jelly roll type configuration for use as cores of rechargeable batteries.

Lastly, it is an object of the invention is to fabricate cores for rechargeable batteries more conveniently, efficiently, and economically.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention may be incorporated into a system for the fabrication of rechargeable battery cores formed of component layers of electrically conductive layers and inter-leafed electrically insulating layers in a coil-like manner which comprises an arbor rotatable about its axis for the receipt and support of the core component layers and for winding such core component layers thereon; associated support roller means located adjacent to the arbor for forming a nip and for feeding the component layers to and around the arbor; tray means positioned adjacent to the arbor and support roller means to feed the component layers to the nip and around the arbor; and a tucker bar operatively associated with the arbor an support roller means adapted to move the leading edge of the insulating component layers for being rotated around the arbor prior to the feeding of the conductive component layers. The arbor is mounted at its ends to raise with respect to the support roller means as the component layers are wrapped therearound. The system include two (2) tray means for supporting and guiding the component layers of electrically insulating paper to and around the arbor and two (2) additional tray means for supporting and guiding the component layers of electrically conductive material to and around the arbor.

The present invention may also be incorporated into apparatus for the assembly of coil-like rechargeable battery cores formed of electrically conductive layers and inter-leafed electrically insulating layers comprising an arbor rotatable about its axis for the receipt and support of the layers and for winding such layers therearound; roller means located adjacent to the arbor for rotating the arbor; means positioned adjacent to the arbor and roller means to guide the layers between the roller means and the arbor; and a tucker operatively positioned with respect to the arbor and the roller means to move the insulating layers in position for being wrapped around the arbor prior to the feeding of the conductive layers to the arbor and roller means.

Lastly, the present invention may be incorporated into a method of fabricating a rechargeable battery core comprising the steps of feeding electrically insulating layers to an arbor rotatable about its axis; feeding electrically conductive anode and cathode sheets to the arbor with the insulating layers located therebetween; tucking the leading edge of an insulating layer around the arbor prior to feeding the conductive sheets; and rotating the arbor to rotate and coil the insulating layers and conductive sheets in inter-leafed manner for constituting a rechargeable battery core.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other methods and structures for carrying out the same purposes of the present invention. It should also be realized by those skilled in the art that such equivalent methods and constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is perspective illustration of a battery core wrapping machine constructed in accordance with the principles of the present invention;

FIG. 2 is an enlarged elevational view of the mechanisms as shown in FIG. 1;

FIG. 3 is a perspective illustration of the mechanisms shown in FIGS. 1 and 2 but taken from another angle;

Similar reference characters refer to similar parts throughout the several views of the drawings.

DETAILED DESCRIPTION OF THE PREFERRED EMBODIMENT

Shown in the figures, with particular reference to FIG. 1, is the primary embodiment of apparatus or machinery 10 for fabricating rechargeable battery cores 12 constructed in accordance with the principles of the present invention.

Figure 7:
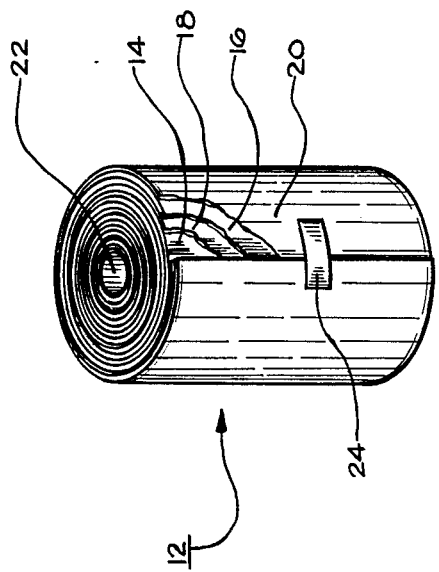
FIG. 7 is a perspective illustration of a finished rechargeable battery core fabricated by the method and apparatus of the present invention but with parts broken away to show certain internal constructions.

For sake of convenience, the finished rechargeable battery core 12 may be seen in FIG. 7. It includes an anode 14 as of nickel, a cathode 16 as of cadmium and insulating layers 18 and 20 as of paper therebetween. The center 22 is hollow while adhesive tape 24 on the exterior paper layer holds the parts together in proper orientation.

The central point of the machinery is a mandrel or an arbor 28 about which the component layers 14, 16, 18 and 20 of the battery core are wrapped. The arbor 28 is mounted horizontally about its axis. Its opposite ends have areas of reduced diameter which are supported for free rotation in slots 32 of depending support plates 34. The support plates 34 are mounted on a horizontal mounting plate 36 secured to a frame 38. The slots 32 are elongated in the vertical direction to allow for free vertical movement of the arbor and its axis upwardly and downwardly while maintaining its horizontal orientation.

Figure 6:
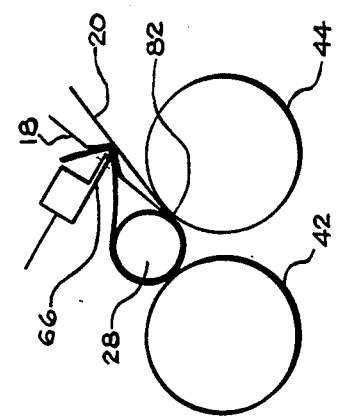
FIGS. 4-6 are sequential elevational views of the apparatus shown in FIGS. 1-3 with the operating elements sequentially illustrating the mode of fabricating such battery core wrappers.
Figure 5:
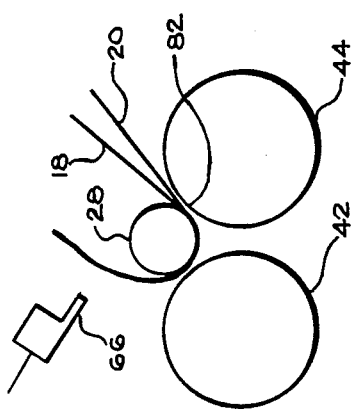
Figure 4:
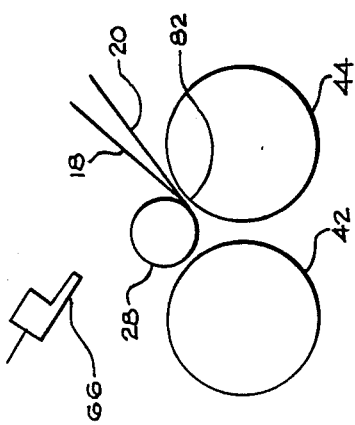

The arbor 28, when in its lower position, is adapted to be supported on a pair of driven rollers 42 and 44. The driven rollers are supported about axes parallel with the axis of the arbor and in a common horizontal plane beneath, and adjacent to opposite sides of, the axis of the arbor. The rollers 42 and 44 have elastomeric surfaces for improved friction for rotating counter clockwise as seen in the drawings. This will impart a clockwise motion to the arbor when operatively positioned thereon. Such rotation will be imparted to the arbor whether it is supporting no battery core component layers as shown in FIG. 2 or whether it is supporting battery core component layers as shown in FIGS. 4 through 6.

The support rollers 42 and 44 are driven by a common motor MOT -1 through a gear arrangement for rotation in the same direction at the same speed. The motor and gear arrangement are conventional and are located on the side of the mounting plate remote from the rollers. The arbor 28 is initially located in resting contact with the surfaces of both support rollers 42 and 44. Note FIG. 2.

Secured with respect to the vertical mounting plate of frame 38 are a series of trays 48, 50, 52 and 54 angled generally tangentially with respect to the surface of the arbor. The trays are adapted to support and guide the component elements of the battery core 12 and to feed them to the arbor and rollers during the fabrication of the cores. The uppermost tray 54 is adapted to support a precut metallic sheet 14 of nickel which constitutes the anode of the battery. Next adjacent thereto is a tray 52 for supporting paper 18, an electrically insulating layer, for being fed beneath the uppermost anode and above the second precut metallic sheet 16 of cadmium located on a tray 50 therebeneath for constituting the cathode. The lowermost tray 48 is for supporting another sheet 20 of paper to constitute an insulating layer between the anode and cathode. The insulator of this lowermost tray constitutes the outermost layer of the battery core when fabricated.

The anode and cathode are supported on their associated trays 50 and 54 in cut sheet form. The layers of insulator are in roll form, supported on rolls 58 and 60, freely rotatable on spindles supported on the frame 38.

Another operative component of the machine is the tucker bar assembly 64 located on the side of the arbor opposite from the trays and their associated sheet feed mechanisms. The tucker bar assembly 64 is adapted to reciprocate a thin tucker bar 66 within its plane of orientation through the energizing of a pneumatic cylinder 68. It is adapted to move the bar 66 from the retracted position as shown in FIGS. 4 and 6 to an extended position as shown in FIG. 5. In its extended position it is adapted to move immediately above the arbor and temporarily remain in such a position so that it will contact and deflect paper 18 and 20 above the arbor in a tangential direction with respect to the arbor for being wrapped therearound during rotation of the arbor and movement of the supported paper from paper support trays. The paper is positioned for being tucked by reciprocable fingers 72 programmed to move together through slots 74 to grip the paper and advance it to the arbor by reciprocation through pneumatic cylinders 76. A three-hundred sixty (360) degree rotation of the arbor advances it to the FIG. 5 position.

The last operative component is the cutter 80. The cutter an electrically energized wire located near the nip 82 formed by the mandrel and support. The cutter is supported for being heated to a paper severing temperature by a controller 86 to cut the two (2) layers of paper 18 and 20 after the fabrication of the core 12 in anticipation of the next core 12 fabrication.

In operation and use, a first operator controlled button or actuator 88 on a controller 86 is energized to feed paper 18 and 20 from the trays 48 and 52 downwardly between the arbor 28 and support rollers 42 and 44 to the nip 82. Note FIG. 4. Thereafter the arbor and rollers will rotate the arbor about three-hundred and sixty (360) degrees by the motor M-1 to orient the paper where it extends upwardly on the side of the arbor closer to the tucker bar. Note FIG. 5. Thereafter, the controller 86 will be energized to advance the tucker bar 66 to move the upstanding paper into deflecting contact with the paper upstream of the nip 82. Note FIG. 6. Further energization of the controller will rotate the rollers to once again rotate the rollers and arbor an additional three hundred sixty (360) degrees to effect the wrapping of the leading edge of both paper layers completely around the arbor. The tucker bar is then retracted with the leading edge of both papers fully wrapped around the arbor.

Once the pair of three hundred sixty degree wraps has been effected, the tucker bar will be retracted for the remainder of the operation. With the two paper insulators extending from the nip between the arbor and support rollers in a V configuration, the operation is ready to continue. At this point the papers will be extending back to supporting roll for the webs of paper. Precut sheets of nickel and camdium, the anode and cathode, are located on the upper and lower trays above the two webs of paper. The anode and cathode are then fed from their supporting trays, preferably by hand, into a position so that their leading edges are in contact with the paper adjacent the nip between the arbor roller and support roller.

The operator then energizes the controller 86 to rotate the support rollers 42 and 44 and thus the arbor 28 to draw the supported anode and cathode layers into the nip 82 and to rotate them between the layers of papers 18 and 20 so that they will form a jelly roll type configuration around the arbor. During such rotation, the arbor is free to rise with the increasing diameter of the arbor material. Its axis will continuously be raised with respect to the axes of the support rollers. When a sufficient number of rotation of the arbor has occurred and the full length of the anode and cathode have been rotated around the arbor, the paper will still extend tangentially from the exterior of the wrapped core. Thereafter the cutter 80 is energized to trim the trailing edge of the paper with its next leading edge in position for generating the next battery core.

The operator then manually turns the arbor and component layers a final three hundred sixty (360) degrees and applies adhesive tape 24 to the trailing edge of the paper to create the final battery core 12. At this position, the controller 86 is once again energized to electrically lift the arbor from the elastomeric rollers with tape having been applied manually to preclude unraveling of the roll. The controller 86 is once again energized to retract the arbor so that the fabricated core may be removed from the machine for assembly, in a subsequent step of the operation, in the fabricating of the rechargeable battery.

The controller 86 is herein described as a semimanual device requiring operator intervention to effect the control sequence. It should be appreciated, however, that the control sequence could be rendered fully automatic by known technical procedures.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described, what is claimed is:

1. A system for the fabrication of rechargeable battery cores formed of component layers of electrically conductive layers and inter-leafed electrically insulating layers in a coil-like manner comprising:
    an arbor rotatable about its axis for the receipt and support of the core component layers and for winding such core component layers thereon;
    associated support roller means located adjacent to the arbor for forming a nip and for feeding the component layers to and around the arbor, the arbor being mounted to raise with respect to the support roller means as the component layers are wrapped therearound;
    tray means positioned adjacent to the arbor and support roller means to support and feed the component layers along separate paths of travel to the nip and around the arbor; and
    a tucker bar operatively associated with the arbor and support roller means, said tucker bar being mounted for movement between said tray means and said arbor on a component layer infeed side of said arbor and along a line of movement which extends across said paths of travel of the component layers for moving leading edges of the insulating component layers into a position for being wrapped around the arbor prior to the feeding of the conductive component layers to said rotatable arbor.

2. Apparatus for the assembly of coil-like rechargeable battery cores formed of electrically conductive layers and inter-leafed electrically insulating layers comprising:
    an arbor rotatable about its axis for the receipt and support of the layers and for winding such layers therearound;
    roller means located adjacent to the arbor rotating the arbor;
    means positioned adjacent to the arbor and roller means to guide and feed the layers along separate paths of travel to the roller means; and
    a tucker operative positioned for movement between said guide and feed means and said arbor on a component layer infeed of side of said arbor along a line of movement which extends across the said paths of travel to move the insulating layers in position for being wrapped around the arbor prior to the feeding of the conductive layers to the rotatable arbor and roller means.

3. A method of fabricating a rechargeable battery core comprising the steps of:
    feeding electrically insulating layers along first and second paths of travel to an arbor rotatable about its axis;

tucking leading edges of said insulating layers at a position adjacent said first and second paths of travel located between a supply position of said insulating layers and said arbor on a component layer infeed side of said arbor for moving said insulating layers into position for being wrapped around the arbor prior feeding the conductive sheets to said rotatable arbor; feeding electrically conductive anode and cathode sheets along third and fourth paths of travel to said arbor with said insulating layers located therebetween; and rotating the arbor to rotate and coil the insulating layers and conductive sheets in inter-leafed manner therearound for constituting a rechargeable battery core.

* * * * *